United States Patent
Xie et al.

(10) Patent No.: US 8,718,672 B2
(45) Date of Patent: May 6, 2014

(54) IDENTIFYING STATUS BASED ON HETEROGENEOUS SENSORS

(75) Inventors: Xing Xie, Beijing (CN); Yin Zhu, Beijing (CN); Yuki Arase, Beijing (CN)

(73) Assignee: Microsoft Corporation, Redmond, WA (US)

(*) Notice: Subject to any disclaimer, the term of this patent is extended or adjusted under 35 U.S.C. 154(b) by 142 days.

(21) Appl. No.: 13/088,755

(22) Filed: Apr. 18, 2011

(65) Prior Publication Data
US 2012/0264446 A1 Oct. 18, 2012

(51) Int. Cl.
H04W 24/00 (2009.01)
H04M 3/42 (2006.01)
H04M 1/66 (2006.01)

(52) U.S. Cl.
USPC ............ 455/456.1; 455/404.1; 455/404.2; 455/411; 455/414.1; 455/418

(58) Field of Classification Search
CPC ....... H04W 4/02; H04W 24/00; H04W 4/025; H04W 8/22; H04W 12/26
USPC ........... 455/404.1, 404.2, 411, 414.1, 418, 455/456.1, 456.3; 340/10.5, 501, 506; 348/143, 146; 709/202, 232; 704/226, 704/240
See application file for complete search history.

(56) References Cited

U.S. PATENT DOCUMENTS

| | | | |
|---|---|---|---|
| 7,843,323 B2* | 11/2010 | Lim et al. | 340/506 |
| 7,958,457 B1* | 6/2011 | Brandenberg et al. | 715/789 |
| 2005/0198353 A1* | 9/2005 | Zmrzli | 709/232 |
| 2006/0026228 A1* | 2/2006 | Kim | 709/202 |
| 2006/0284979 A1* | 12/2006 | Clarkson | 348/143 |
| 2009/0051524 A1 | 2/2009 | Lim et al. | |
| 2009/0063141 A1* | 3/2009 | Huang | 704/226 |
| 2009/0291672 A1* | 11/2009 | Treves et al. | 455/414.1 |
| 2010/0141397 A1 | 6/2010 | Kim et al. | |
| 2010/0240962 A1 | 9/2010 | Content | |
| 2010/0318293 A1* | 12/2010 | Brush et al. | 701/211 |
| 2010/0323657 A1* | 12/2010 | Barnard et al. | 455/404.1 |
| 2011/0137651 A1* | 6/2011 | Rose et al. | 704/240 |
| 2011/0172918 A1* | 7/2011 | Tome | 701/220 |
| 2011/0238379 A1* | 9/2011 | Misra et al. | 702/187 |
| 2012/0140042 A1* | 6/2012 | Albertson et al. | 348/46 |
| 2012/0221172 A1* | 8/2012 | Anderson | 701/1 |

OTHER PUBLICATIONS

Albinali et al. "Recognizing Sterotypical Motor Movements in the Laboratory and Classroom: A Case Study with Children on the Autixm Spectrum", 11th International Conference on Ubiquitous Computing (UbiComp '09) Orlando, Florida, Sep. 30-Oct. 3, 2009, 10 pages.

Arase et al., "User activity understanding from mobile phone sensors", 12th ACM International Conference on Ubiquitous Computing (UbiComp 2010), Copenhagen, Denmark, Sep. 26-29, 2010, pp. 391-392.

(Continued)

*Primary Examiner* — Inder Mehra
(74) *Attorney, Agent, or Firm* — Lee & Hayes, PLLC

(57) ABSTRACT

Techniques for determining a status of a user are described. A mobile device equipped with sensors may collect sensor data pertaining to transportation modes of the user, tracking locations of the user, identifying environmental noise levels surrounding the user, or speech being spoken in proximity to the user. Features of the collected sensor readings are then used to infer activities the user may be performing. Based at least in part on the multiple inferred activities, a status of the user is determined.

19 Claims, 7 Drawing Sheets

(56) References Cited

OTHER PUBLICATIONS

Bao et al., "Activity Recognition from User-Annotated Acceleration Data", 3rd International Conference on Pervasive Computing (Pervasive 2004), Linz/Vienna, Austria, Apr. 18-23, 2004, 17 pages.

Bardram et al., "Ubiquitous Computing Fundamentals", CRC Press, John Krumm (Ed.), Sep. 21, 2009, 4 pages (Forward and Introduction), retrieved on Nov. 29, 2010 at <<http://research.microsoft.com/en-us/um/people/jkrumm/UbiquitousComputingFundamentals/>>.

Bimbot et al., "A Tutorial on Test-Independent Speaker Verification", EURASIP Journal on Applied Signal Processing, vol. 4, 2004, pp. 430-451.

Choudhury et al., "The Mobile Sensing Platform: An Embedded Activity Recognition System", IEEE Pervasive Computing. vol. 7, No. 2, Apr.-Jun. 2008, pp. 32-41.

Choudhury et al., "Modeling Face-to-Face Communication Using the Sociometer", Workshop Proceedings of UbiComp, Seattle, Washington, Oct. 12, 2003, 6 pages.

Dai et al., "PerFallD: A Pervasive Fall Detection System Using Mobile Phones", 1st IEEE PerCom Workshop on Pervasive Healthcare (PerHealth 2010), in conjunction with 8th IEEE International Conference on Pervasive Computing and Communications, (PerCom 2010), Mannheim, Germany, Mar. 29-Apr. 2, 2010, 6 pages.

Dietterich, "Machine Learning for Sequential Data: A Review", In Structural, Snytactic, and Statistical Pattern Recognition, Lecture Notes in Computer Science, T. Caelli (Ed.), vol. 2396, 2002, 15 pages.

Eagle et al., "Reality mining: sensing complex social systems", Personal and Ubiquitous Compututing, vol. 10. No. 4, May 3, 2006, pp. 255-268.

Ganti et al., "Multisensor Fusion in Smartphones for Lifestyle Monitoring", International Conference on Body Sensor Networks (BSN 2010), Singapore, China, Jun. 7-9, 2010, pp. 36-43.

Hong et al., "Motile health monitoring system based on activity recognition using accelerometer", Simulation Modelling Practice and Theory, vol. 18, Issue 4, Apr. 2010, pp. 446-455.

Kratz et al., "Unraveling Searm: Improving Mobile Gesture Recognition With Visual Feedback Techniques", Presentation by Jon Thomsen, 27th Conference on Computer Human Interaction (CHI '09), Boston, Massachusetts, Apr. 4-9, 2009, pp. 16 pages.

Lester et al., "A Hybrid Discriminative/Generative Approach for Modeling Human Activities", 19th International Joint Conference on Artificial Intelligence (IJCAI 2005), Edinburgh, Scotland, UK, Jul. 30-Aug. 5, 2005, 7 pages.

Lester et al., "A Practical Approach to Recognizing Physical Activities", 4th International Conference on Pervasive Computing (PERVASIVE 2006), Dublin, Ireland, May 7-10, 2006, 16 pages.

Letchner et al., "Large-Scale Localization from Wireless Signal Strength", 20th National Conference on Artificial Intelligence (AAAI '05), Pittsburgh, Pennsylvania, Jul. 9-13, 2005, 6 pages.

Liao et al., "Location-Based Activity Recognition Using Relational Markov Networks", 19th International Joint Conference on Artificial Intelligence (IJCAI '05), Edinburgh, Scotland, UK, Jul. 30-Aug. 5, 2005, 6 pages.

Mitchell, "Mining Our Reality", Perspectives: Computer Science, vol. 326, No. 5961, Dec. 18, 2009, pp. 1644-1645.

Pan et al., "Transfer Learning for WiFi-based Indoor Localization", 23rd AAAI Conference on Artificial Intelligence (AAAI '08), Workshop on Transfer Learning for Complex Tasks, Chicago, Illinois, Jul. 13-17, 2008, 6 pages.

Reddy et al., "Determining Transportation Mode on Mobile Phones", 12th IEEE International Symposium on Wearable Computers (ISWC '08), Pittsburgh, Pennsylvania, Sep. 28-Oct. 1, 2008, 4 pages.

Stauffer et al., "Learning Patterns of Activity Using Real-Time Tracking", IEEE Transactions on Pattern Analysis and Machine Intelligence, vol. 22, No. 8, Aug. 2000, pp. 747-757.

van Kasteren et al., "Accurate Activity Recognition in a Home Setting", 10th International Conference on Ubiquitous Computing (UbiComp '08), Seoul, Korea, Sep. 21-24, 2008, 9 pages.

Wyatt et al., "Towards the Automated Social Analysis of Situated Speech Data", 10th International Conference on Ubiquitous Computing (UbiComp '08), Seoul, Korea, Sep. 21-24, 2008, 4 pages.

Yang, "Activity Recognition: Linking Low-level Sensors to High-level Intelligence", 21st International Joint Conference on Artificial Intelligence (IJCAI '09), Pasadena, California, Jul. 11-17, 2009, pp. 20-25.

Yin et al., "Activity Recognition via User-Trace Segmentation", ACM Transactions on Sensor Networks, vol. 4, No. 4, Article 19, Aug. 2008, 34 pages.

Yin et al., "High-level Goal Recognition in a Wireless LAN", 19th National Conference on Artificial Intelligence (AAAI '04), San Jose, California, Aug. 7-11, 2004, pp. 20-25.

Zheng et al., "Drive Smartly as a Taxi Driver", 7th International Conference on Ubiquitous Intelligence and Computing (UIC 2010), Xi'an, China, Oct. 26-29, 2010, 3 pages.

Zheng et al., "Learning Transportation Mode from Raw GPS Data for Geographic Application on the Web", 17th International World Wide Web Conference (WWW '08), Beijing, China, Apr. 21-25, 2008, 10 pages.

Zhu et al., "Human Daily Activity Recognition in Robot-assisted Living Using Multi-sensor Fusion", 2009 IEEE International Conference on Robotics and Automation, Kobe, Japan, May 12-17, 2009, 7 pages.

* cited by examiner

IDENTIFYING STATUS BASED ON HETEROGENEOUS SENSORS

BACKGROUND

Recognition systems monitor or describe a functional status of a user and learn patterns of activity based on observations. Typical recognition systems may use special sensors in the environment to interact with sensors attached to the user. For example, typical recognition systems rely on: cameras or video recorders for motion tracking, radio-frequency identification (RFID) for identification and tracking, Bluetooth technology for exchanging information over short distances, sensors attached to the body of the user for tracking, and so forth. However, these devices are not part of a normal routine in the environment of the user's daily life. Rather, the devices are intrusive and require attaching to the user's body. An option for recognition systems is to use global positioning system (GPS) sensors.

However, GPS sensors may not provide reliable location and time information. For example, a computing device may use a GPS tracking unit to identify a location or to track movement of a user when the user is close to a GPS sensor. The location or movement, for example, may be recorded via GPS devices or GPS-enable cellular phones. However, there may be a lack of tracking information attributed to a poor or a nonexistent connection to GPS satellites. This poor or nonexistent connection to GPS satellites may be due to the user being inside a building or other structure, due to reflection off the exteriors of large buildings or other objects, due to destructive interference of the signals from towers in urban areas, or due to the type of construction materials used in some buildings. Thus, it is difficult to rely on the GPS sensor alone to track locations of the user.

SUMMARY

This disclosure describes designating a status of a user. A status application collects sensor data from sensors on a mobile device. The status application infers activities from the sensor data being collected, such as a transportation mode of the user, a location of the user, an environmental condition surrounding a mobile device, and speech being spoken in proximity to the mobile device. The inferred activities are based on using at least an accelerometer or a barometer to determine the transportation mode of the user of the mobile device, a detector to track the location of the user of the mobile device, a microphone to record the environmental condition surrounding the user of the mobile device, or speech being spoken in proximity to the user of the mobile device. The status application determines a status of the user based at least in part on multiple inferred activities.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Portable computing devices currently provide many applications and services to a user. In addition, providing a recognition system without having to deploy special devices and intrusive type sensors, a portable computing device may integrate sensors to record sensor data pertaining to the user or in proximity to the user. In an example implementation, the sensors may be part of a status application on the portable computing device to record or monitor daily activities of the user. The sensors may be readily available on the portable computing device without being intrusive on the user. The status application may then use the sensor data to infer information about the user's activities and the context pertaining to the user's activities.

This disclosure describes an example process of collecting sensor data on the portable computing device and inferring activities of the user by extracting features from the collected sensor data. Inferred activities may include, but are not limited to, transportation modes of the user in possession of the mobile device, locations of the user in possession of the mobile device, environmental conditions surrounding the user in possession of the mobile device, and speech being spoken within proximity to the user in possession of the mobile device. Based at least in part on the multiple inferred activities, the process further includes determining a status of the user. The status of the user may be applied in other applications, services, or devices. Furthermore, recommendations may be provided to the user based on previous recorded data of behaviors or activities of the user.

The discussion begins with a section entitled "Example Environment," which describes a non-limiting network environment to collect sensor data. A section entitled "Example High-Level Functions," follows, which describes example high-level functions for determining the status of the user. A third section, entitled "Example Mobile Device," describes an example mobile device with sensor modules for collecting the sensor data. A fourth section, entitled "Example Processes" describes example processes of the high-level functions for collecting the sensor data, inferring activities of the user by extracting features from the collected sensor data, and determining the status of the user. A fifth section, entitled "Example Applications and Recommendations," describes example applications based on the status of the user. Finally, the discussion ends with a brief conclusion.

This brief overview, including section titles and corresponding summaries, is provided for the reader's convenience and is not intended to limit the scope of the claims, nor the proceeding sections.

Example Environment

Figure 1:
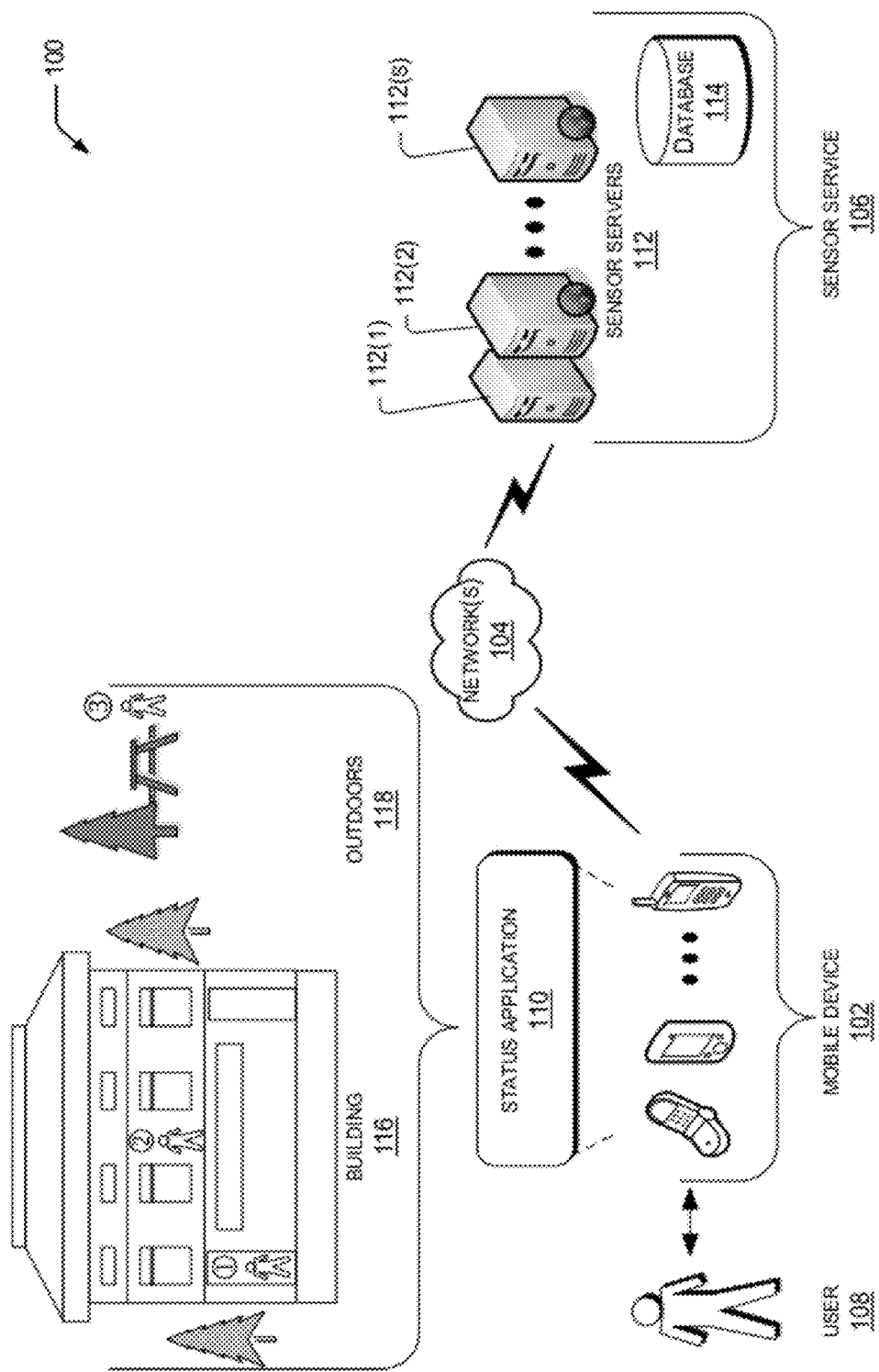
FIG. 1 is a pictorial diagram of an example environment for collecting sensor data to determine a status of a user.

FIG. 1 illustrates an example architectural environment 100, usable to collect sensor data of the user. The environment 100 includes an example mobile device 102, which is configured to connect via one or more network(s) 104 to access a sensor service 106 for a user 108. The mobile device 102 may take a variety of forms, including, but not limited to, a smart phone, a portable computing device, a cellular phone, a personal digital assistant, a personal navigation device, a personal computer, a portable media player, or any other computing device. The mobile device 102 is configured to collect sensor data via sensors integrated on the mobile device 102, to determine the status of the user 108, and to provide recommendations.

The network(s) 104 represents any type of communications network(s), including, but not limited to, wire-based networks (e.g., public switched telephone, cable, and data networks), and wireless networks (e.g., cellular, satellite, Wi-Fi, Bluetooth, and radio-frequency).

The sensor service 106 represents an application service that may be operated as part of any number of online service providers, such as an e-health service, a map service, a social networking site, a search engine, or the like. Also, the sensor service 106 may include additional modules or may work in conjunction with modules to perform the operations discussed below. In example implementations, the sensor service 106 may be implemented at least in part by a status application executed by servers, or by a status application 110 stored in memory of the mobile device 102.

In the illustrated example, the sensor service 106 is hosted on one or more sensor servers, such as server 112(1), 112(2), . . . , 112(S), accessible via the network(s) 104. The sensor servers 112(1)-(S) may be configured as plural independent servers, or as a collection of servers that are configured to perform larger scale functions accessible over the network(s) 104. The sensor servers 112 may be administered or hosted by a network service provider.

The environment 100 may include a database 114, which may be stored on a separate server or with the representative set of servers 112 that is accessible via the network(s) 104. The database 114 may store information collected and generated by the status application 110 and may be updated on a predetermined time interval, in real-time, or periodically.

Typically, the user 108 carries the mobile device 102 in a pocket or a purse, and the mobile device 102 accesses the status application 110 and/or the sensor service 106 to start collecting the sensor data. However, collecting sensor data about individuals presents privacy concerns, such as transmitting the sensor data of the individuals over the network(s) 104. Options are available to address privacy concerns. The options are that an individual user may choose to opt-in to participate or to opt-out to not participate in tracking or sharing of sensor data. As such, the tracking of the sensor data may require explicit user consent.

In the example physical environment shown in the upper left of FIG. 1, the status application 110 starts recording when the sensors on the mobile device 102 are activated by a wireless signal (e.g., from a global system for mobile communications (GSM) device, from a Bluetooth® hands free device, from a Wi-Fi access point in the building 116, or from a broadcast radio signal). That is, the status application 110 may be recording when the user 108 enters the building 116 (shown as ①), and may record the user 108 walking up the stairs to the second level and walking through the building 116 to their office (shown as ②). Furthermore, the status application 110 may continue recording when the user 108 leaves the building 116 to go outdoors 118 for a short walk or to eat lunch at the picnic table (shown as ③).

FIGS. 2 and 4-6 are flowcharts showing example processes for performing high-level functions, collecting the sensor data, inferring activities of a user by extracting features from the collected sensor data, and determining the status of the user. The processes are illustrated as collections of blocks in logical flowcharts, which represent sequences of operations that can be implemented in hardware, software, or a combination thereof. For discussion purposes, the processes are described with reference to the computing environment 100 shown in FIG. 1. However, the processes may be performed using different environments and devices. Moreover, the environments and devices described herein may be used to perform different processes.

For ease of understanding, the methods are delineated as separate steps represented as independent blocks in the figures. However, these separately delineated steps should not be construed as necessarily order dependent in their performance. The order in which the process is described is not intended to be construed as a limitation, and any number of the described process blocks may be combined in any order to implement the method, or an alternate method. Moreover, it is also possible for one or more of the provided steps to be omitted.

Example High-Level Functions

Figure 2:
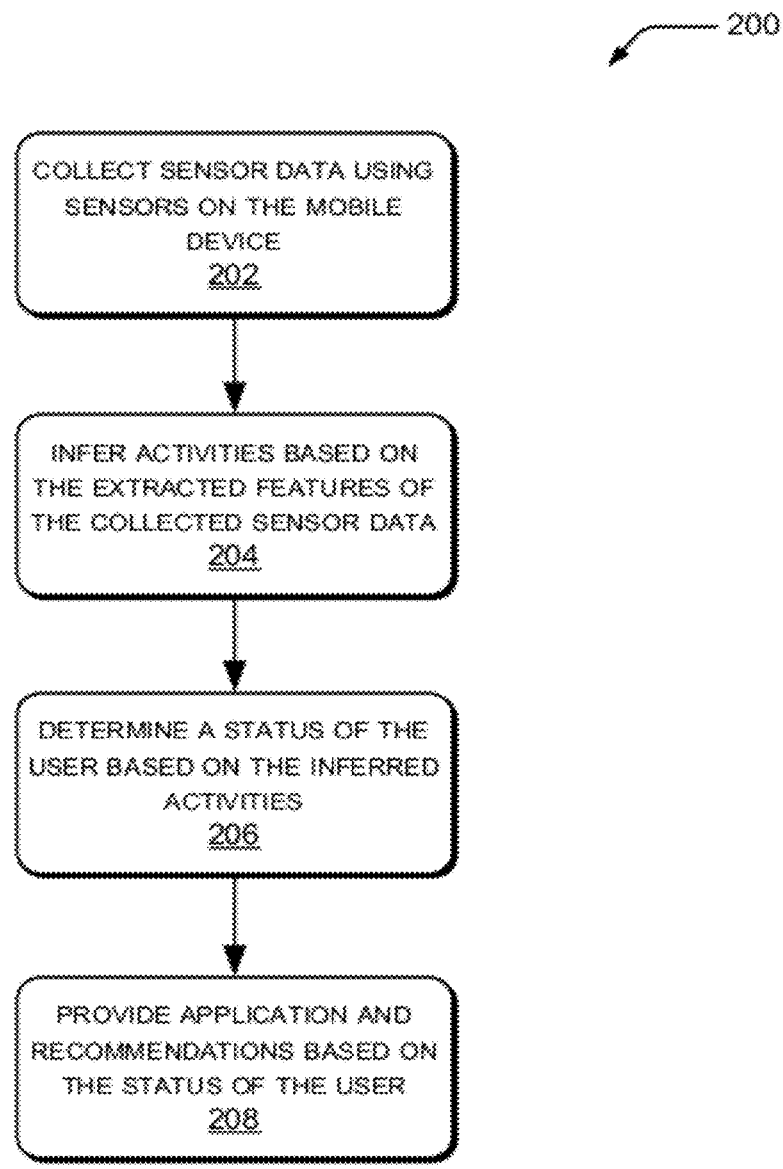
FIG. 2 is a flowchart showing an example process of high-level functions for determining the status of the user and providing recommendations.

FIG. 2 is a flowchart showing an example process 200 of high-level functions performed by the status application 110. The process 200 may be divided into four phases to collect sensor data. In practice, the status application 110 collects the sensor information associated with the mobile device 102, which may be referred to as sensor information of the user 108. Each of the illustrated phases may be used in the environment of FIG. 1, may be performed separately or in combination, and without any particular order.

A first phase 202 is to collect sensor data using sensors on the mobile device 102. The status application 110 collects the sensor data based on, for example, indications of non-movements, movements, locations, or environmental conditions around the user 108, along with detecting speech being spoken in proximity to the user 108. The status application 110 extracts features from the collected sensor data.

A second phase 204 is to infer activities based on the extracted features of the collected sensor data. The status application 110 uses a discriminating power to identify correlations between features of the collected sensor data and possible activities. For example, features of the collected sensor data may include but are not limited to, velocity, acceleration, and direction of movement of the user 108, locations of the user 108, environmental noise levels surrounding the user 108, and speech being spoken in proximity to the user 108. Specific inferred activities based on these features may include but are not limited to the user 108 being stationary, walking, riding in an escalator or an elevator, the user 108 is sitting in an office or a conference room, the user 108 is sitting in a quiet location or in a location with some background noise, or the user 108 is speaking or other individuals are speaking.

A third phase 206 is to determine a status of the user 108 based on the inferred activities. In an example implementation, the status application 110 gathers information about the inferred activities of the user 108 that occurred and are likely to occur in the user's daily life. For example, the status application 110 may determine at least five possible statuses of the user 108 in a working office environment. The example statuses include working in the office, participating in a meeting, moving around the office, dinning, and attending a seminar.

A fourth phase 208 is to provide recommendations based on the determined status of the user. The status application 110 may provide recommendations to the user 108 based on combining information that pertains to the user's transportation modes, the locations, environmental noise levels, and/or speeches heard in the vicinity. Details of the phases 202-208 are discussed with reference to FIGS. 4-6 below.

Example Mobile Device

Figure 3:
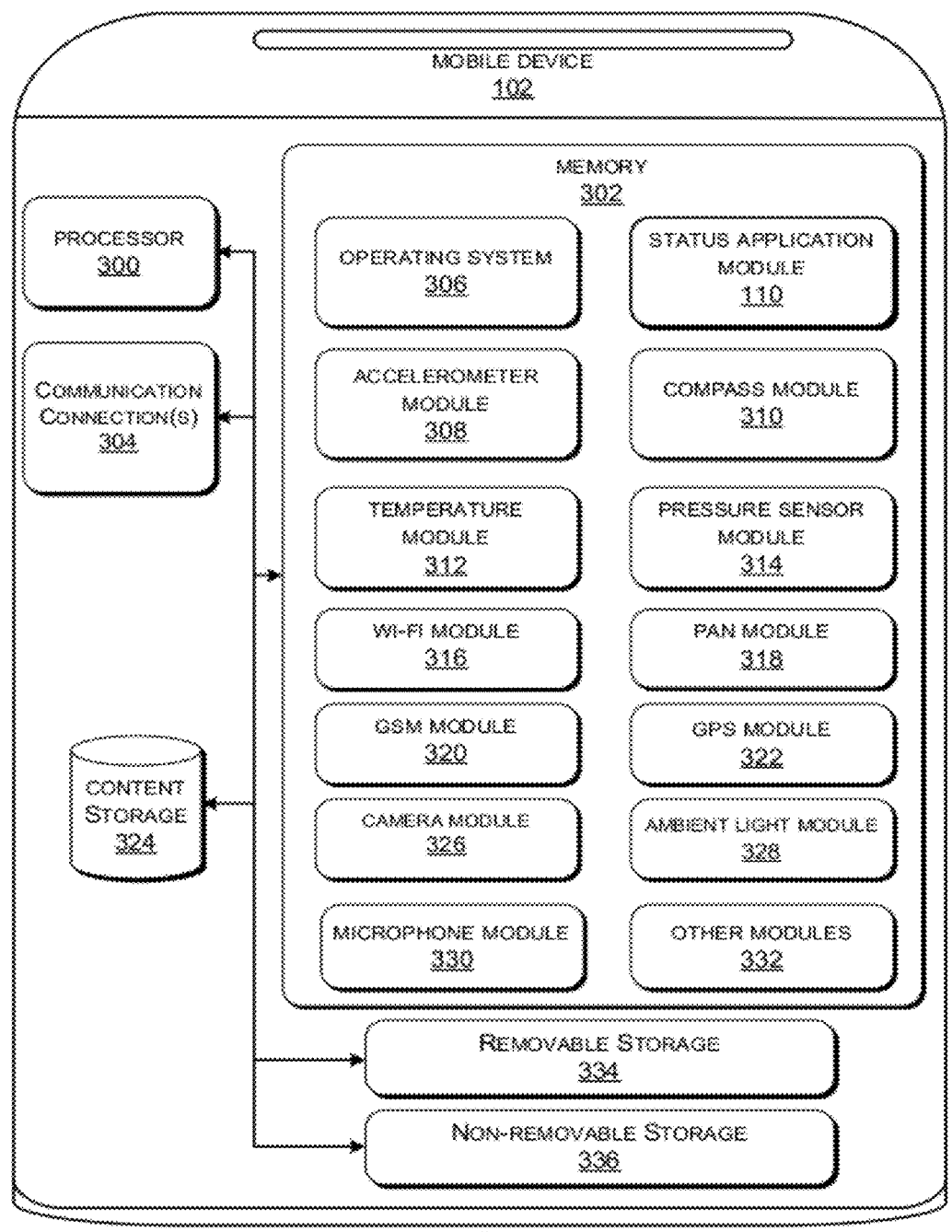
FIG. 3 is block diagram that illustrates example components of a mobile device to collect sensor data.

FIG. 3 is a block diagram that illustrates example components of a mobile device 102 to collect the sensor data. The mobile device 102 may be configured as any suitable device capable of implementing a status application 110 and/or accessing the sensor service 106 for online services. In one example configuration, the mobile device 102 includes at least one processor 300, a memory 302, and a communication connection(s) 304. The communication connection(s) 304 may include access to a wide area network (WAN) module, a local area network module (e.g., Wi-Fi), a personal area network module (e.g., Bluetooth), and/or any other suitable communication modules to allow the mobile device 102 to communicate over the network(s) 104.

Turning to the contents of the memory 302 in more detail, the memory 302 may store computer instructions that are loadable, embedded, or encoded, and executable on the processor 300. The memory 302 includes an operating system 306, and the status application module 110.

The memory 302 also includes an accelerometer module 308, a compass module 310, a temperature module 312, and a pressure sensor module 314 (e.g., a barometer or a digital pressure sensor). The modules 308, 310, 312, and 314 collect sensor data to identify the transportation modes of the mobile device 102. That is, to infer a current transportation mode of the user 108. As discussed above, this may be based on the user 108 giving permission to opt-in for the status application 110 or the sensor service 106 to track their movements.

The heterogeneous sensor modules on the mobile device 102 may work individually or together to collect the sensor data. When one module is no longer able to collect the sensor data, another module compensates to record the data. For example, modules 308, 310, 312, and 314 may be used separately or together to collect acceleration and elevation data for non-movement and movement information, to collect temperature changes when moving from one area to another area, and to receive directional data relative to the earth's magnetic poles for recording directional information.

The accelerometer module 308 detects magnitude and direction of physical acceleration or gravitational force, and may sense orientation and inclination. The accelerometer module 308 detects movement and determines which direction is 'Up' for the mobile device 102.

The compass module 310 determines navigational direction relative to the Earth's magnetic poles. The compass module 310 may be digital or of a magnetized pointer to indicate orientation data. In some implementations, the accelerometer module 308 and the pressure sensor module 314 may collect sensor data for the movement information without relying on the temperature data and/or the directional information.

The temperature module 312 records a change in a temperature reading for a predetermined time interval to further track the user 108 with the mobile device 102, for example moving from indoors to outdoors or vice versa. The temperature module 312 may rely on a thermometer to measure the temperature. For example, the temperature module 312 may record a constant indoor temperature of 70 degrees Fahrenheit with +/−five degrees variability for several hours, and then detect a change in temperature. The temperature change may be due to an increase or decrease, such as the user 108 with the mobile device 102 moving to a hotter outdoor temperature in the summer or moving to a colder outdoor temperature in the winter.

In another example, the status application 110 may detect the user 108 with the mobile device 102 moving from sitting to standing, as long as the mobile device 102 is in a pocket or a hand of the user 108. This motion is based on information collected by the accelerometer module 308 and the pressure sensor module 314. The accelerometer module 308 would record little to slight forward movement while the pressure sensor module 314 would record some small changes in elevation at the same time. In other words, the elevation changes would be small versus the elevation changes pertaining to the user 108 climbing stairs or riding an elevator or an escalator.

The memory 302 may also include, but is not limited to, a Wi-Fi module 316, a personal area network (PAN) module 318, a global system for mobile communications (GSM) module 320, and a GPS module 322 to collect sensor data for tracking locations of the user 108 of the mobile device 102. These four modules mentioned may be used separately or together to collect location data of the mobile device 102 with the intent to track a location of the user 108. Again, this may be based on the user 108 giving permission to opt-in for the status application 110 or the sensor service 106 to track their movements and locations.

The Wi-Fi module 316 may record locations of the mobile device 102 based on detecting Wi-Fi signals via one or more Wi-Fi access points (e.g., hotspots) that cover an area as small as a few rooms or as large as several square miles. The Wi-Fi access points tend to be activated and are usually placed in specific areas of an environment. For example, Wi-Fi access points may be located in a ceiling of a hallway of the building 116, a ceiling of a conference room of the building 116, ceilings in each floor of the building 116, or in exterior soffits of the building 116 that are placed around picnic areas in the outdoors 118.

The mobile device 102 also includes content storage 324 to store the collection of sensor data, Wi-Fi access points data, locations, recommendations, related applications, and the like. Alternatively, this information may be stored in the database 114. The content storage 324 of the mobile device 102 or the database 114 may include scanned data for Wi-Fi access points at different locations in the building 116 or the outdoors 118. Furthermore, the content storage 324 or the database 114 may store scanned data for Wi-Fi access points in other locations, such as in satellite offices of a corporation, in a university campus, in a hospital, and the like.

The mobile device 102 may scan the Wi-Fi signals and a list of Wi-Fi access points is returned from the content storage 324 or the database 114. Each scan of the Wi-Fi access points represents an instance as a feature vector. Each dimension of the feature vector represents one Wi-Fi access point and its value is a received strength of that access point. Also, each scan of the Wi-Fi access point is associated with multiple parameters. However, the status application 110 records a media access control (MAC) address as one unique identifier and a signal strength as another identifier associated with each Wi-Fi access point. The status application module 110 may record the strength of the signal at each Wi-Fi access point location. Then, the signal strength recorded may be mapped to the previous recorded locations stored in the content storage 324 or the database 114, using a nearest neighbor principle to find the closest points. Based on this, the Wi-Fi module 316 identifies the locations of the mobile device 102 (e.g., the user 108). Also, general classification techniques based on labeling of locations may be used to identify the locations of the mobile device 102.

The PAN module 318 relies on PAN devices that are similar to Wi-Fi access points while consuming less power than the Wi-Fi module 316. The PAN module 318 may record locations of the mobile device 102 by detecting signals from the PAN devices over short distances. The PAN module 318 may not provide consistent information, as the PAN devices that interact with the PAN module 318 are often moved to different positions frequently. Furthermore, the PAN devices tend to rely on a master-slave relationship, which may include a first PAN device as the master and a limited number of PAN devices as the slaves, to communicate with the master.

The GSM module 320 may provide indoor and outdoor locations of the mobile device 102, in conjunction with the other modules, or when other types of signals are not available. The GSM module 320 emits a roaming signal to a nearby antenna tower, which uses a multilateration based on a signal strength to locate the mobile device 102, in order to locate the user 108. The GSM module 320 identifies actual coordinates of the mobile device 102 to approximate where the user 108 is currently located. The GSM module 320 may rely on localization systems, such as network-based, handset-based, subscriber identity module (SIM) based, or hybrid (combination of network-based and handset-based) techniques to track the locations of the mobile device 102. As a result, the GSM module 320 identifies the locations of the user 108, which may, for example, be shared with the user's coworkers for work related functions or with the user's connections for social networking purposes.

In an implementation, the PAN module 318 of the mobile device 102 may record or track the wireless signals from the PAN devices located in the building 116. However, due to the limited number of PAN devices, the PAN module 318 may no longer receive signals. In instances, the GSM module 320 of the mobile device 102 may already be emitting a roaming signal to a nearby GSM network to track and to locate the mobile device 102. Thus, this is an example of two sensors that are actively recording signals for tracking and locating the mobile device 102. As a result, the GSM module 320 compensates when the PAN devices are out of range of the PAN module 318.

The GPS module 322 may track locations of the mobile device 102 on Earth, as long as there is an unobstructed line of communication to GPS satellites. The GPS module 322 tracks the locations with coordinates that represent an actual location of the mobile device 102 more closely than the other described tracking mechanisms. In some instances, the GPS module 322 may rely on other signals for tracking when the GPS signal is no longer available.

The memory 302 may further include a camera module 326, an ambient light module 328, a microphone module 330, and other modules 332. The camera module 326 may be used to take photographs of the environment surrounding the mobile device 102. This is one technique of actually showing the environmental conditions surrounding the user 108, such as whether there may be individuals conversing proximate to the user 108, affecting the level of background noise. The ambient light module 328 may record the conditions of ambient light surrounding the mobile device 102. For example, the ambient light module 328 may record darkness, to which a corresponding location may be for a conference room that may be dimly lit, where a speaker is presenting slides. In another example, the ambient light module 328 may record a change in lighting, from going indoors to outdoors or vice versa.

The microphone module 330 may detect speech from a speaker's voice that is spoken in proximity to the mobile device 102. For example, proximity to the mobile device 102 indicates a range of 10 to 20 foot radius. Due to privacy issues, the microphone module 330 in combination with the processor 300 and the memory 302 may promptly transform the speaker's voice into features, rather than save original speech content. For example, the microphone module 330 may extract acoustic features from each voice segment of the speaker's voice. Acoustic features may include, but are not limited to, pitch, rate, and duration of sound syllables. For example, the microphone module 330 extracts the acoustic features, such as these elements that are present in an individual's speech, to be recorded and stored. Based on the transformation and extraction, the status application module 110 may filter this data immediately, if needed.

The other modules 332 may include an amplitude modulated (AM) and/or frequency modulated (FM) radio module, an audio module, a magnetometer module, a sound level meter module, and the like. Alternatively, any or all of these other modules 332 may be embodied as integrated circuits, sensors, or other hardware devices, rather than being implemented as software modules stored in memory. Furthermore, other sensors may be easily integrated into the mobile device 102 to collect new sensor data. The memory 302 may also include one or more other applications (not shown) for implementing various other functionalities, such as an appointment calendar application, an email application, a word processing application, a media player application, and the like, simultaneously with the status application 110 that may operate at least in part, based on the status of the user 108. Thus, the user 108 may be using the mobile device 102 for other purposes with these applications, while the recording of the sensor data occurs in the background.

The mobile device 102 may also include additional removable storage 334 and/or non-removable storage 336. Any memory described herein may include volatile memory (such as RAM), nonvolatile memory, removable memory, and/or non-removable memory, implemented in any method or technology for storage of information, such as computer-readable instructions, data structures, applications, program modules, emails, and/or other content. Also, any of the processors described herein may include onboard memory in addition to or instead of the memory shown in the figures.

As described herein, computer-readable media includes, at least, two types of computer-readable media, namely computer storage media and communications media.

Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

Computer storage media includes volatile and non-volatile, removable storage and non-removable storage media implemented in any method or technology for storage of information such as computer readable instructions, data structures, program modules, or other data. In contrast, communication media may embody computer readable instructions, data structures, program modules, or other data in a modulated data signal, such as a carrier wave, or other transmission mechanism. As defined herein, computer storage media does not include communication media.

Example Processes

Figure 4:
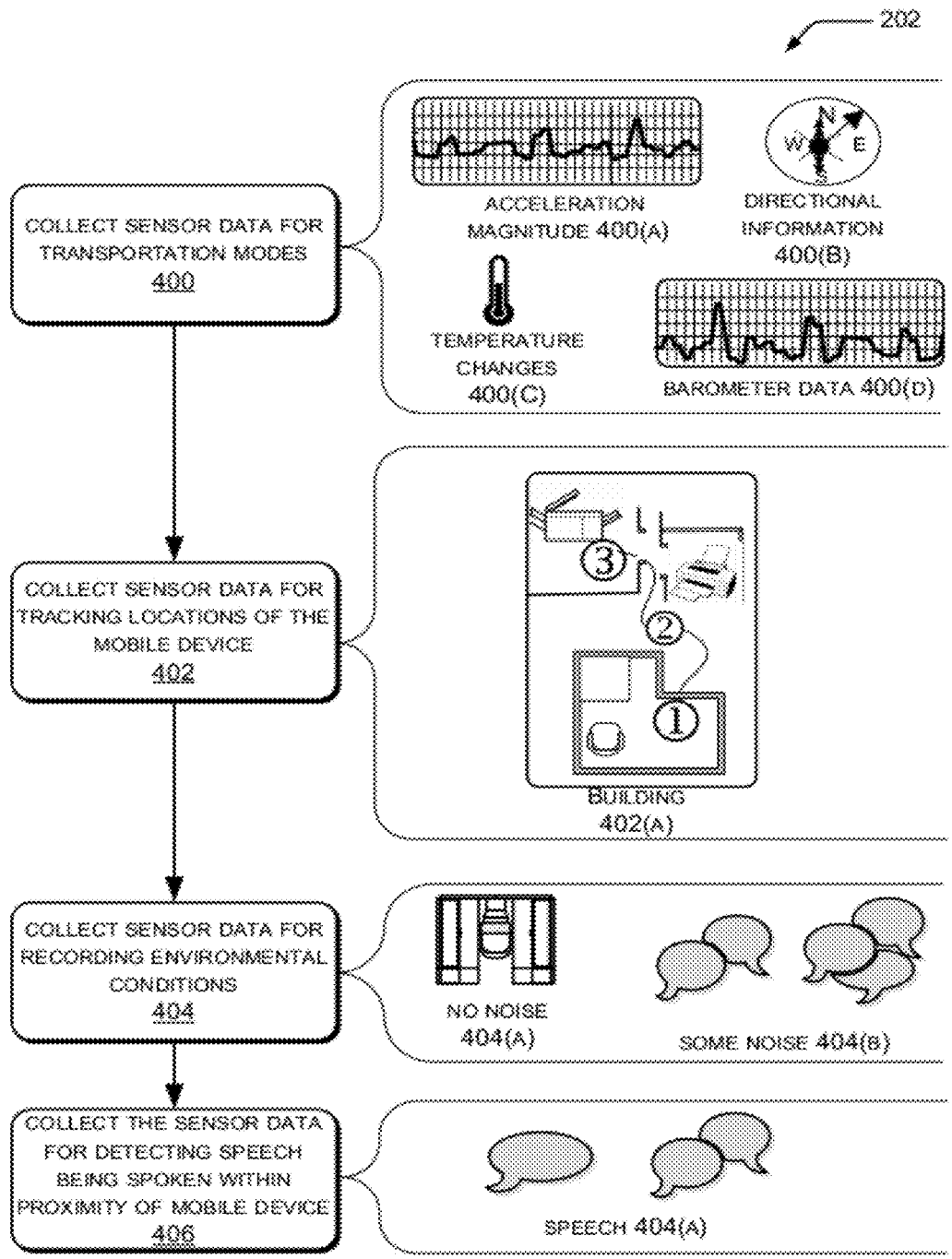
FIG. 4 is a pictorial flowchart of example processes for collecting the sensor data.
Figure 5:
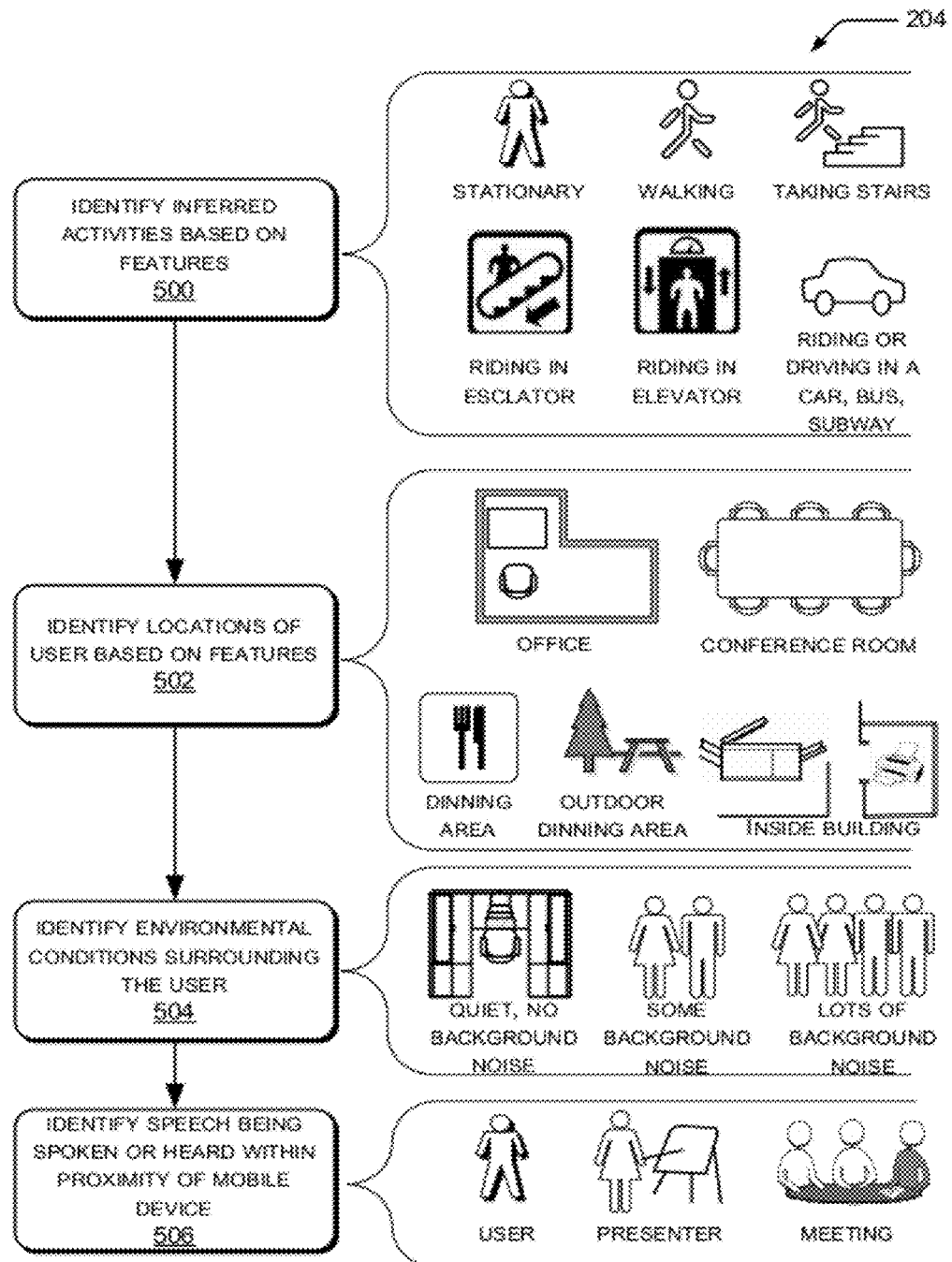
FIG. 5 is a pictorial flowchart of examples of inferring activities based at least in part on extracting features from the collected sensor data.
Figure 6:
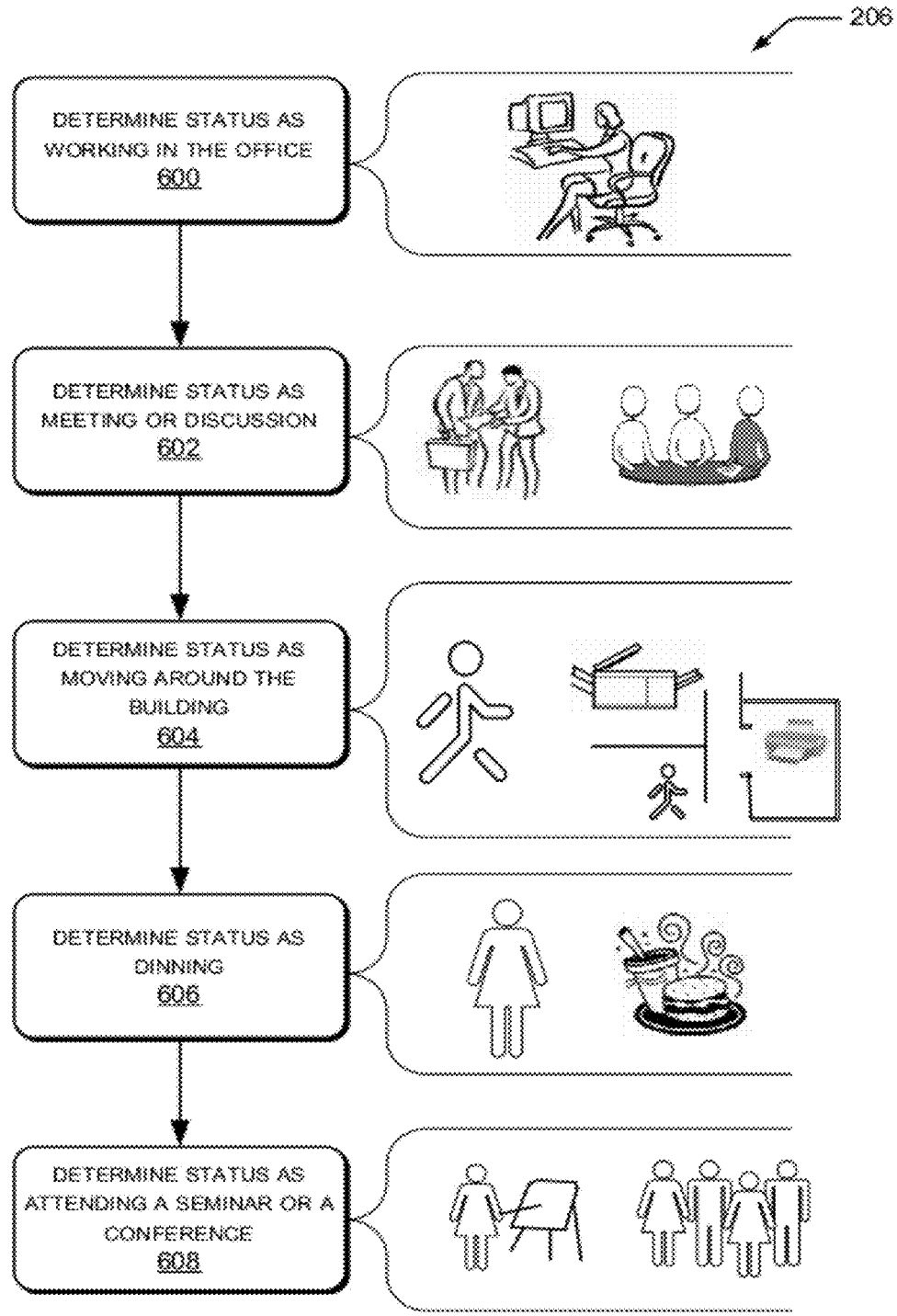
FIG. 6 is a pictorial flowchart of example statuses of the user based at least in part on the multiple inferred activities.

FIGS. 4-6 are pictorial flowcharts showing example processes of the high-level functions described above with reference to FIG. 2. As mentioned, the process 200 collects the sensor data, and an algorithm analyzes features of the collected sensor data to infer activities of the user 108.

FIG. 4 is a pictorial flowchart showing an example process 202 of collecting the sensor data using the heterogeneous sensors on the mobile device (discussed at a high level above). The status application 110 uses at least four subsystems to collect data used to infer transportation modes of the user 108, locations of the user 108, environmental conditions surrounding the user 108, and speech being spoken in proximity to the user 108. While the discussion may refer to collecting sensor data associated with the user 108, the practice is that the sensors are actually tracking the mobile device 102, which is assumed to be in the possession of the user 108.

At 400, the heterogeneous sensors on the mobile device 102 are configured to collect the sensor data for inferring transportation modes of the user 108. Shown are examples of sensor data that is used to infer the transportation modes. The sensor data may include, but is not limited to, acceleration magnitude 400(A) that measures acceleration and direction (e.g., collected by the accelerometer module 308), directional information 400(B) relative to the Earth's magnetic poles (e.g., collected by the compass module 310), temperature changes 400(C) (e.g., collected by the temperature module 312), and barometer data 400(D) to reflect changes in elevation (e.g., collected by the pressure sensor module 314).

The accelerometer module 308 readily measures acceleration and direction, which may be used to infer the transportation modes. There may be instances when the user 108 has placed the mobile device 102 in their pocket or purse without regard to position and orientation of the mobile device 102. To address this issue, the status application 110 measures a strength of the acceleration using the following equation:

$$s = \sqrt{x^2 + y^2 + z^2} - g$$

where x, y, and z are the strengths along the three directions of a 3D accelerometer. The variable g represents a strength of the gravitational field for the Earth's surface. The standard average of g may be expressed as a constant that is approximately 9.81 m/s² or 32.2 ft/s². The variable s represents a sampling frequency, which ranges from 1 Hz to 15 Hz.

The status application 110 collects and mines the sensor data that is sequential and sets a window size of signals for the sequence data. That is, the window size may be the size of data that the mobile device 102 may receive for sequence data. The status application 110 infers activities based on the window size of signals. Each window size of signals is a segment. Accordingly, the different kinds of sensor signals may have different segmentation methods and window sizes. In an example implementation, the accelerometer module 308 records the data as the sequential accelerometer strength, which is segmented into fixed-time windows with adjacent windows having 50% overlap. For each segment, a transportation mode is assigned. For example, the transportation modes include but are not limited to: being stationary, walking, running, taking stairs, or riding in an elevator or an escalator.

In an implementation, the acceleration magnitude 400(A) is collected every second, where the sampling frequency is 5 hertz (Hz). Hertz is a unit of frequency defined as the number of cycles per second. The status application 110 collects the acceleration magnitude 400(A) for at least ten minutes. The features are extracted and the window size may be set at three seconds (i.e., 15 data points) using at least 50% window overlap.

The status application 110 extracts the features from each segment to identify a current transportation mode. In particular, extracted features from each segment include but are not limited to: an average strength, a variance of the strength, an energy of the strength, a sum of the fast Fourier transform (FFT) coefficients and a weighted sum of the FFT coefficients. In an example implementation, the segments are labeled as training data to train a classification mode and the trained mode is then used to predict unlabeled segments of accelerometer strength.

In an implementation, the status application 110 augments and splits walking activity detected by the accelerometer module 308 to include major directions from the compass module 310 and/or elevations from the pressure sensor module 314. The accelerometer module 308 measures a rate of acceleration that has been identified within a range that is typical of the walking activity. For example, the walking activity may be split into a smaller number of walking steps by adding a direction or an elevation for each of the smaller number of steps.

At 402, the process collects sensor data for tracking locations of the mobile device 102. The process collects sensor data that has been generated from the Wi-Fi signal, the PAN signal, the GSM signal or the GPS signal to determine the user's current location. The modules for tracking locations include, but are not limited to, the Wi-Fi module 316, the PAN module 318, or the GMS module 320 to detect the signals that record locations of the mobile device 102, for example, inside the building 116.

At 402(A), the illustration shows tracking inside the building. The locations being tracked are the user 108 may be located in an office (shown as ①), the user 108 may be located in the hallway (shown as ②), and the user 108 may be located in the copier room (shown as ③).

The signals help identify the locations in the building 116 to determine where the user 108 is currently located relative to previous recorded location information. A matching may occur based on the current sensed information from one or more of the Wi-Fi signal, the PAN signal, the GSM signal, or the GPS signal and the previous recorded location information. Thus, the status application 110 determines whether the user's current location is the same as or close to a previous recorded location that has been stored in the database 114 or the content storage 324.

At 404, the process collects sensor data for recording environmental conditions. The microphone module 330 detects whether there is no noise 404(A) in the background or some noise 404(B) in the background surrounding the user 108. The status application 110 computes a distribution of the noise level in a histogram for background noise. For each sound segment, the status application 110 extracts a loudness histogram as the features.

At 406, the process collects the sensor data for detecting speech being spoken in proximity to the mobile device 102 in possession of the user 108. The microphone module 330 detects whether there is speech 406(A) spoken by the user 108 or by other individuals. An application such as automatic speech recognition may be used to detect the speech. For example, Mel-frequency cepstrum (MFC) may be used to represent a short-term power spectrum of a sound. The MFC uses Mel-frequency cepstral coefficients (MFCCs) that are derived from the Fourier transform of a signal. The status application 110 uses fast Fourier transform (FFT)-based Mel-frequency cepstral coefficients (MFCCs) to extract meaningful acoustic features from each voice segment. In an example implementation, the dimension of the features may be set between 10 and 30. For each voice segment belonging to a speaker, the status application 110 may include a set of feature vectors $X=\{x_i\}_{i=1}^{n}$ where n is the number of voice segments and $x_i$ is a d-dimensional MFCC feature vector for voice segment i.

In addition, the status application 110 builds a Gaussian mixture model (GMM) for each speaker's recorded voice as part of training. During a test phase, a set of GMMs may accept or reject an unidentified voice. The GMM determines an optimal parameter set λ for a probability density function of:

$$p(x|\lambda) = \Sigma_{i=1}^{M} w_i p_i(x).$$

The density is a weighted sum over M Gaussian density functions, where $w_i$ represents mixture weights. The probability density function describes a relative likelihood for the optimal parameter set to occur.

Each Gaussian density is defined as:

$$p_i(x) = \frac{1}{(2\pi)^{D/2}|\Sigma_i|^{1/2}} \exp\left(-\left(\frac{1}{2}\right)(x-\mu_i)' \sum_i^{-1} (x-\mu)\right)$$

where $\mu_i$ represents a mean vector and $\Sigma_i$ a variance matrix of the i-th Gaussian mixture. The Gaussian density includes a constraint on the mixture weights $w_i$ that is defined as $\Sigma_i^M w_i=1$, so $p(x|\lambda)$ is a valid probability density function.

The status application 110 uses the GMM to find the optimal parameter set $\lambda=\{w_i,\mu_i,\Sigma_i\}_{i=1}^{M}$ to fit a voice data set X via an expectation-maximization (EM) algorithm. The EM algorithm determines maximum likelihood estimates of parameters in the GMM. The GMM finds a nearest covariance matrix having an element located in a position between two elements of a random vector. The covariance matrices are diagonals having the same kinds of sums of square appear. For example, when the covariance matrices are diagonals, the training phase and the testing phase evolve matrix inversion operations of full matrices quickly. Thus, for an unverified voice segment, the status application 110 extracts MFCC feature vector x' and calculates $p(x'|\lambda)$ to get a likelihood of the voice segment belonging to the GMM.

In an implementation, for an incoming feature vector x', the status application 110 selects the GMM with a maximum likelihood of the voice segment belonging to the GMM. This maximum likelihood is compared to a threshold to decide whether to accept or to reject the voice segment of the speaker's voice. The threshold is chosen based on cross validation to assess how the result of a statistical analysis generalizes to an independent data set. For example, F1 measure can be used as a criterion to select an accepting threshold. For a given threshold, the average F1 measure is calculated for labeled feature vectors from all of the speakers. Then the different thresholds are used to find the one with best average F1 measure.

The status application 110 trains the data for the four subsystems: transportation modes of the user 108, locations of the user 108, environmental conditions surrounding the user 108, and speech being spoken or heard in proximity to the user 108. The training and inference are based on standard supervised/classification methods based on the labeled segments. During the collection of the sensor data, the labeled segments may be used to represent each working status.

As part of the training, the status application 110 may provide on-line predictions of each of the four subsystems. The status application 110 may build a histogram for each of the subsystems normalized to 1.0. For instance, predicting the transportation mode may include, walking eight times and taking the elevator twice may identify a status as moving around.

FIG. 5 is a pictorial diagram of examples of inferred activities based on features of the collected sensor data, as discussed at a high level above with reference to phase 204. At 500, the status application 110 identifies the inferred modes of transportation based on features of each segment of signals. The inferred modes of transportation include but are not limited to: being stationary, walking, taking stairs, riding in the escalator, riding in the elevator, riding or driving in the car, a bus, or a subway. One of the inferred activities may be assigned to each segment of collected sensor data.

At 502, the status application 110 identifies the locations of the user 108 based on extracted features of the signals and the detected coordinates. The detected coordinates may include, for example, latitude and longitude. In an implementation, the locations of the user 108 may include but are not limited to: an office, a conference room, a dining area, an outdoor dining area, and inside the building 116.

At 504, the status application 110 identifies environmental conditions surrounding the user 108 based on features of loudness represented by the histogram. In an implementation, the environmental conditions surrounding the user 108 may include, but are not limited to, noise levels such as: quiet background without any noise, some background noise, and lots of background noise with many individuals speaking at the same time.

At 506, the status application 110 identifies speech being spoken or heard in proximity to the mobile device 102 in possession of the user 108. In an implementation, the speech being spoken may include, but is not limited to: the user 108 speaking, a presenter speaking, or other people speaking in a meeting.

FIG. 6 is a pictorial diagram of example processes 206 to determine a status of the user 108 based on the multiple inferred activities (discussed at a high level above). As discussed, the status of the user 108 is determined based on the sensors collecting the sensor data and inferring activities based on features of the collected sensor data. In an implementation, the status application 110 determines the status for the user 108 based on a working office environment, such as one where an employee works in an office complex with walking trails and picnic areas. For example, the status application 110 determines at least five different statuses, all of the user 108, that may occur in the working office environment.

At 600, the status application 110 determines a status as working in the office. This status implies the user 108 is working in their own office alone. Some of the inferred activities may include: the user 108 being stationary or of no movement, the user 108 being located in their own office, no background noise level surrounding the user 108, and no speech being spoken in proximity to the user 108 of the mobile device 102. Furthermore, the status application 110 may calculate a seat ratio based on a ratio for the location predicted in a segment to be the user's seat during training. A high seat ratio indicates the user 108 is most likely in their office.

At 602, the status application 110 determines the status as meeting or discussion 602. This status implies the user 108 is involved with one or more individuals in a meeting or a discussion of work topics. This status is based on the inferred activities of: the user 108 located in the office or in a conference room, the background includes some noise surrounding the user 108, and speech is spoken in proximity to the user 108.

At 604, the status application 110 determines the status as moving around the building. This status is based on the inferred activities of: the user 108 walking or taking stairs, the user 108 is located in the building 116, no background noise or some background noise surrounding the user 108, and speech may be spoken in proximity to the user 108. Furthermore, the status application 110 may identify a number of different locations based on the labeled segments. The numbers of different locations that have been identified, such as the hallway, the copier room, or a printer room during training, provide strong indications of the status of the user 108 moving around the building 116.

At 606, the status application 110 determines the status as dinning. This status implies the user 108 is eating a meal. Some of the inferred activities may include: the user 108 being stationary or of no movement, the user 108 is located in the dining area(s) or an outdoor dining area, lots of background noise surrounding the user 108, and speech is spoken in proximity to the user 108.

At 608, the status application 110 determines the status as attending a seminar or a conference. This status 608 implies the user 108 is participating by listening to a presenter and sitting with many other individuals. Some of the inferred activities may include: the user 108 being stationary or no movement, the user 108 is located in the conference room of the building 116, lots of background noise surrounding the user 108, and speech is spoken in proximity to the user 108.

In this example implementation, the status application 110 designates at least five different statuses that correspond to a large percentage of the user's daily activities in the working office environment. The sensor data of these activities are collected by the sensors on the mobile device 102 and the determined status is based on an assumption that two different statuses may occur at the same time. In practice, two different statuses such as the user 108 may be working in their office 600 and dining 606 may occur at the same time.

Example Applications and Recommendations

Figure 7:
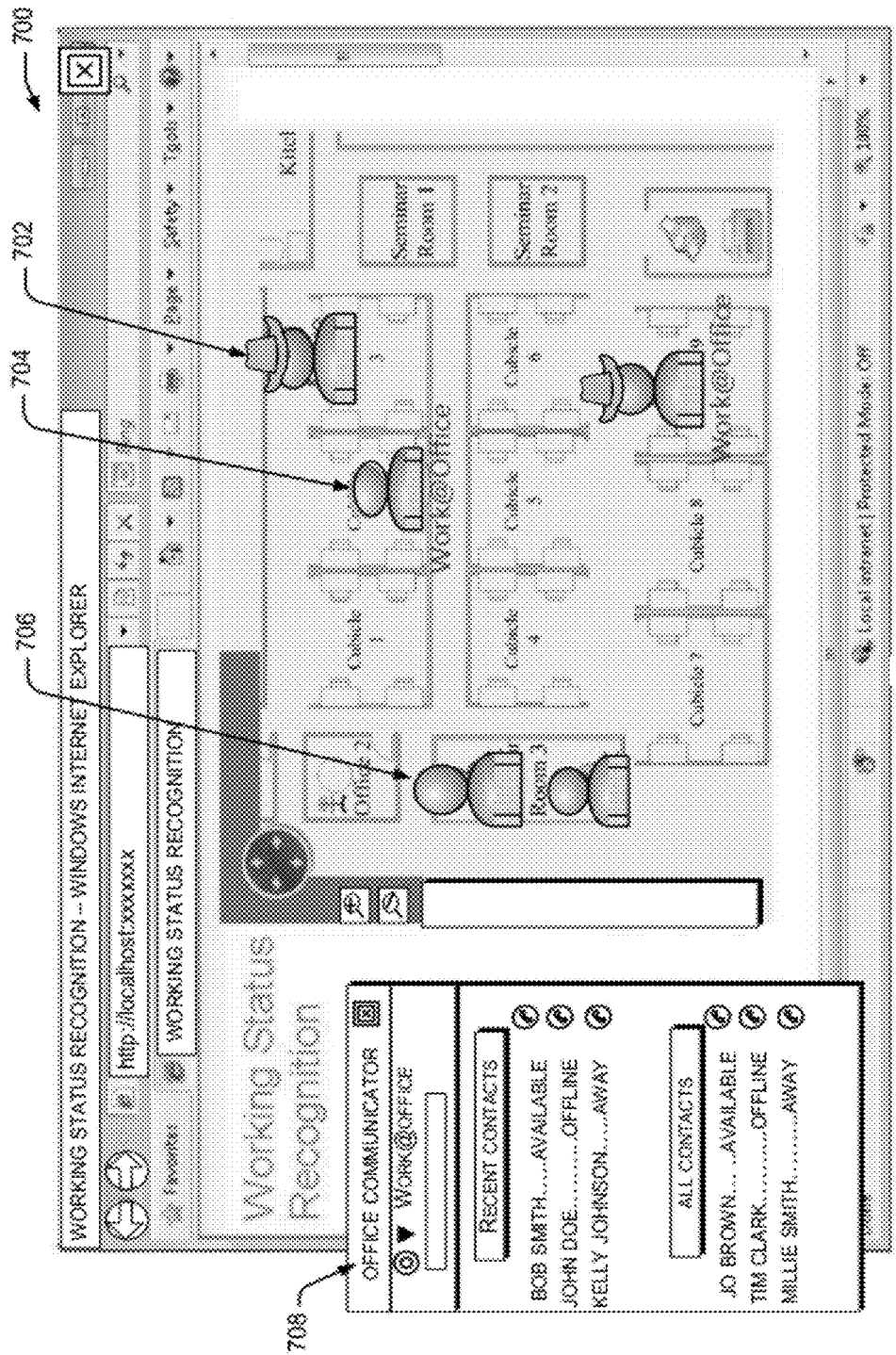
FIG. 7 is a pictorial diagram of an example application user interface based on the status of the user.

The status application 110 provides an example application 208 based on the status of the user (discussed at a high level above). FIG. 7 is a pictorial diagram of the example application based on the status of the user 108. In an implementation, the status application 110 integrates the status of the user 108 as context for other devices, applications, or services. The applications or services include, but are not limited to: health management, location-based services, human computer interaction, social networking, and automatic behavior monitoring and understanding.

FIG. 7 illustrates a web interface 700 displaying the status of each member in a research group on a layout of a working office environment. For example, a first status 702 indicates a first member is moving about the office, a second status 704 indicates a second member is working in the office, and a third status 706 indicates a third member and a fourth member are meeting in a conference room. In an example implementation, based on the statuses shown in FIG. 7, notifications, calls, emails, and other services or applications may be managed by considering the working office environment and the activities of the users within this environment.

FIG. 7 also illustrates an example office communicator 708. The office communicator 708 receives the status of each member from the status application 110. Based on the status of each member, the office communicator 708 identifies whether the members shown as recent contacts and all contacts, are available, offline, or away. This assists the user 108 on how and when to communicate with their recent contacts or all contacts.

In another implementation, the status application 110 may be used to change the user presence information automatically in an instant messaging (IM) program. For example, the status application 110 may determine the user 108 is attending a seminar based on the multiple inferred activities. Based on the status of the user 108, the IM program may then change the user's status as being offline or away, depending on how the user 108 had set up the notification in the IM program.

In yet another implementation, the status application 110 may be used to update information by automatically downloading the data when the user 108 is not actively using the mobile device 102. For example, the status application 110 may designate the user 108 is attending a seminar or a conference based on the inferred activities. Based on the status of attending the seminar or the conference, the status application 110 may then download the data.

As discussed above with reference to phase 208, the status application 110 provides recommendations based on the status of the user. In an implementation, the status application 110 provides wellness recommendations based on behaviors of the user 108 previously recorded to monitor a current behavior of the user 108. For example, the status application 110 monitors a current time that the user 108 eats dinner, such as eating dinner late at night about 8 pm. However, the past behavior previously recorded indicated dinner for the user 108 often occurred around 6 pm. After recording or monitoring the current behavior of eating meals late at night for several days, the status application 110 may display a recommendation on a user interface, or send an email or a text message to the user 108 as a reminder such as "to eat dinner at 6 pm."

In another implementation, the status application 110 provides fitness recommendations based on past behavior of the user 108 previously recorded. The past behavior may include exercise, such as walking around a track or walking around the trail outside of the building for exercise at least several times a week. The status application 110 monitors the user's current behavior, which includes not walking around the track and not walking around the trail outside of the building for a week, and compares the current behavior with the behavior previously recorded to note that the user 108 has dropped or reduced the exercise of walking. The recommendation that may be displayed, sent via email, or sent via text message to the user 108, may include a reminder to "take a walk" or "increase exercise."

In yet another implementation, the status application 110 provides health recommendations based on past behavior of the user 108 previously recorded, such as taking the stairs to one's office. The status application 110 monitors the user's current behavior, which includes riding the elevator, and compares it with the behavior previously recorded to note that the user 108 has avoided taking the stairs. The recommendation that may be displayed, sent via email, or sent via text message to the user 108 may suggest to "take stairs."

A current status of the user 108 may be saved and added to existing status data or behavior data stored in memory of the mobile device 102. If desired, the status of the user 108 may be sent to another computing device to share the information with coworkers for work related functions, with friends for social networking purposes, with a medical facility for monitoring the health status of the user 108, or with a dietician for monitoring eating habits of the user 108. The user 108 may attach or embed the saved status in a form of communication (e.g., email, text message, etc.) to transmit to the other computing device. In some instances, the status application 110 may automatically send the saved information as updates at regular intervals.

By way of example and not limitation, the above techniques may be implemented to support sharing status or locations among an individual or individuals on a contact list or as part of a group communication.

Conclusion

Various instructions, methods, techniques, applications, and modules described herein may be implemented as computer-executable instructions that are executable by one or more computers, servers, or telecommunication devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. The functionality of the program modules may be combined or distributed as desired in various implementations. An implementation of these modules and techniques may be stored on or transmitted across some form of computer-readable media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method comprising:
    collecting sensor data from sensors on a mobile device;
    inferring from the sensor data a transportation mode, a location and an environmental condition surrounding the mobile device;
    designating a status of a user of the mobile device based at least in part on analysis of the transportation mode, the location and the environmental condition;
    monitoring, by a status application of the mobile device, an activity of the user;
    detecting, by the status application, a modification of the monitored activity; and
    providing, by the status application, a recommendation to the user based at least in part on a difference between the modified activity and the monitored activity.

2. The method of claim 1, further comprising determining the transportation mode using a barometer, the determining comprising:
    identifying whether the user is stationary or moving; and
    identifying whether the user is changing elevation when a barometric pressure change occurs at a predetermined rate during a time interval.

3. The method of claim 1, further comprising determining the transportation mode to identify whether the user is stationary, moving, taking stairs, riding in an escalator, riding in an elevator, or riding in transportation vehicle.

4. The method of claim 1, further comprising tracking the location of the user, the tracking comprising:
    detecting at least a signal from one of: a Wi-Fi access point, a Global System for Mobile Communications (GSM), a Personal Area Network (PAN), a Global Positioning System (GPS), or a broadcast radio signal; or
    detecting a change in a temperature reading from a temperature sensor for a predetermined time interval.

5. The method of claim 1, further comprising recording the environmental condition surrounding the mobile device, the recording comprising automatically recording a background noise level.

6. The method of claim 1, further comprising recording speech being spoken in proximity to the mobile device, the recording comprising:
    detecting a speech from a speaker's voice; and
    extracting acoustic features from each voice segment of the speaker's voice.

7. The method of claim 1, wherein the status of the user comprises at least one of working in an office, participating in a meeting, moving in a building, eating a meal, or attending a seminar.

8. The method of claim 1, further comprising augmenting the transportation mode of the user or the location of the user with data collected from at least one of:
    a compass, a magnetometer, an ambient light sensor, a camera, a microphone, a sound level meter, an amplitude modulated (AM) radio frequency module, or a frequency modulated (FM) radio frequency module.

9. The method of claim 1, further comprising integrating the status of the user as a context for other devices, applications, or services.

10. A mobile device comprising:
    a memory;
    a processor coupled to the memory;
    a plurality of modules stored in the memory and executable on the processor, the plurality of modules comprising:
    a status application module configured to:
        collect sensor data on the mobile device,
        monitor an activity of a user of the mobile device,
        detect a modification of the monitored activity, and
        provide a recommendation to the user of the mobile device based at least in part on a difference between the modified activity and the monitored activity;
    an accelerometer module or a barometer module to identify transportation modes of the user of the mobile device;
    a Wi-Fi module, a Global System for Mobile Communications (GSM) module, a Personal Area Network (PAN) module, and/or a Global Positioning System (GPS) module to track locations of the user of the mobile device;
    a microphone module to record environmental conditions surrounding the user of the mobile device, and to record speech being spoken in proximity to the user of the mobile device.

11. The mobile device of claim 10, wherein the transportation modes include the user is stationary, moving, taking stairs, riding in an escalator, riding in an elevator, or riding in a transportation vehicle.

12. The mobile device of claim 10, wherein the status application module is further configured to determine a status of the user based on the sensor data, the status of the user including at least one of working in an office, participating in a meeting, moving in a building, eating a meal, or attending a seminar.

13. The mobile device of claim 12, wherein the status application module is further configured to integrate a context of the user for applications, services, and other computing devices by sending an alert or a notification of the status of the user being unavailable when the user is participating in a meeting or attending a seminar.

14. The mobile device of claim 10, further comprising a compass module, a camera module, or an ambient light module to collect sensor data to augment the transportation modes of the user or to augment tracking locations of the user.

15. One or more computer storage media encoded with instructions that, when executed by a processor of a mobile device, perform operations comprising:

receiving an explicit consent from a user of a mobile device for sensor data tracking;

collecting, by a status application included in the mobile device of the user, sensor data from sensors of the mobile device;

inferring, by the status application, an activity of the user of the mobile device based on the collected sensor data;

monitoring, by the status application, the activity of the user of the mobile device;

recording, by the status application, a modification of the monitored activity;

providing, by the status application, a recommendation to the user of the mobile device based at least in part on a difference between the modified activity and the monitored activity.

16. The one or more computer storage media of claim 15, wherein:

the sensor data comprises a magnitude of accelerometer data or a barometric pressure of a barometer to identify movement of the user of the mobile device;

the magnitude is a change in velocity with respect to an inertial space to determine whether the user of the mobile device is moving or is stationary; and the barometric pressure represents a change in altitude to determine whether the user is changing floor levels, taking stairs, riding an escalator, or riding an elevator.

17. The one or more computer storage media of claim 15, wherein the sensor data comprises a signal from a detector to track locations of the user, the signal comprising one of: a Wi-Fi access point, a Global System for Mobile Communications (GSM), a Personal Area Network (PAN), or a Global Positioning System (GPS).

18. The one or more computer storage media of claim 15, wherein:

the sensor data comprises a recording from a microphone to identify environmental conditions surrounding the user or to detect speech being spoken in proximity to the user;

identifying the environmental conditions surrounding the user comprises recording an ambient noise level in a background; and detecting the speech being spoken in proximity to the user comprises extracting acoustic features from voice segments of a speaker's voice.

19. One or more computer storage media of claim 15, wherein providing the recommendation comprises providing a suggestion to the user to perform a past activity previously recorded by the status application via a text message or an email.

* * * * *